No. 789,074.

Patented May 2, 1905.

UNITED STATES PATENT OFFICE.

AURELIUS J. SWAYZE, OF DANVILLE, NEW JERSEY.

PROCESS OF MAKING POTASSIUM SALTS.

SPECIFICATION forming part of Letters Patent No. 789,074, dated May 2, 1905.

Application filed July 5, 1904. Serial No. 215,389.

*To all whom it may concern:*

Be it known that I, AURELIUS J. SWAYZE, a citizen of the United States, residing at Danville, in the county of Warren and State of New Jersey, have invented a certain new and useful Process of Making Sulfur Compounds of Potassium, of which the following is a specification.

This invention relates to the manufacture of potassium salts, and has for its object the provision of a process for making such products from feldspar, gypsum, and a reducing agent which will be efficient, economical, and easily carried out.

The process comprises the production of potassium salts in the form of sulfate and sulfid by fusing potash-feldspar with gypsum in contact with a reducing agent, as carbon in the form of coke or coal.

Potash-feldspar (orthoclase, $K_2O Al_2O_3 6SiO_2$) and gypsum ($CaSO_4$) in the presence of a reducing agent, such as coke or coal, are fused in a blast-furnace. The materials are used in a crushed state, preferably about the size of pea-coal, and the furnace is of ordinary construction, except that the exit-pipe has water in the form of spray injected therein to wash out the volatilized products. The fusion of the materials will result in the production of potassium sulfate ($K_2SO_4$) and calcium-aluminum silicate, ($CaO Al_2O_3 6SiO_2$,) and at a high heat in the presence of the reducing agent the reduction of the sulfate to sulfid ($K_2S$) and the evolution of carbon monoxid (CO) is effected, theoretically the reactions which occur being substantially as follows:

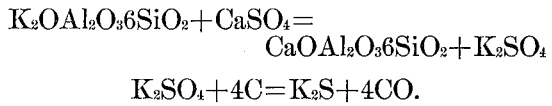

$K_2SO_4 + 4C = K_2S + 4CO$.

The potassium salts are volatilized and pass out through the exit-pipe of the furnace and are thereby recovered from the slag.

It has been found that the use of one-third gypsum to two-thirds feldspar, by weight, gives the best results, as in practice an excess of sulfuric acid ($SO_3$) and lime (CaO) in sufficient quantities are produced to render the resulting slag more fusible. When this proportion of materials is used, silicate of lime and alumina is produced, having two molecules of lime to replace one of potash.

Having thus described my invention, what I claim as new, and desire to secure by Letters Patent, is—

1. The process of producing potassium salts which consists of heating feldspar in the presence of gypsum.

2. The process of producing potassium salts which consists in heating feldspar and gypsum in the presence of a reducing agent.

3. The process of producing potassium salts which consists in heating feldspar and gypsum in the presence of carbon.

4. The process of producing potassium sulfate which consists in heating potash-feldspar in the presence of gypsum.

5. The process of producing potassium sulfid which consists in heating potash-feldspar and gypsum in the presence of a reducing agent.

6. The process of producing potassium sulfid which consists in heating potash-feldspar and gypsum in the presence of carbon.

7. The process of producing potassium salts which consists in heating in a closed furnace potash-feldspar in the presence of gypsum.

8. The process of producing potassium salts which consists in heating in a closed furnace potash-feldspar and gypsum in the presence of a reducing agent.

9. The process of producing potassium salts which consists in heating in a closed furnace potash-feldspar and gypsum in the presence of carbon.

10. The herein-described process which consists in mixing in a crushed state potash-feldspar, gypsum, and a reducing agent, and fusing the same.

11. The herein-described process which consists in mixing in a crushed state potash-feldspar, gypsum, and carbon, and fusing the same.

12. The herein-described process which consists in mixing in a crushed state potash-feldspar, gypsum, and a reducing agent, and fusing the same in a closed vessel.

13. The herein-described process which consists in mixing in a crushed state potash-feldspar, gypsum, and carbon, and fusing the same in a closed vessel.

14. The herein-described process which consists in mixing in a crushed state potash-feldspar, gypsum, and coal, and fusing the same.

15. The herein-described process which consists in mixing in a crushed state potash-feldspar, gypsum, and a reducing agent, fusing the same, and collecting the volatilized potassium products in water.

In testimony whereof I affix my signature in presence of two witnesses.

AURELIUS J. SWAYZE.

Witnesses:
 LAMONT D. GUERIN,
 R. S. McCRACKEN.